US 11,919,468 B2

United States Patent
Acker et al.

(10) Patent No.: US 11,919,468 B2
(45) Date of Patent: Mar. 5, 2024

(54) SIDE AIRBAG AND VEHICLE-OCCUPANT RESTRAINT SYSTEM HAVING A SIDE AIRBAG

(71) Applicant: ZF AUTOMOTIVE GERMANY GMBH, Alfdorf (DE)

(72) Inventors: Dominique Acker, Gschwend (DE); Jürgen Scherr, Waldstetten (DE); Kathrin Weinhardt, Mutlangen (DE); Andreas Loos, Rechberghausen (DE); Javier Acedo Ibanez, Simancas Valladolid (ES)

(73) Assignee: ZF AUTOMOTIVE GERMANY GMBH, Alfdorf (DE)

( * ) Notice: Subject to any disclaimer, the term of this patent is extended or adjusted under 35 U.S.C. 154(b) by 0 days.

(21) Appl. No.: 16/960,150

(22) PCT Filed: Dec. 6, 2018

(86) PCT No.: PCT/EP2018/083732
§ 371 (c)(1),
(2) Date: Jul. 6, 2020

(87) PCT Pub. No.: WO2019/110705
PCT Pub. Date: Jun. 13, 2019

(65) Prior Publication Data
US 2021/0170978 A1   Jun. 10, 2021

(30) Foreign Application Priority Data

Dec. 8, 2017 (DE) ...................... 10 2017 129 286.1
Apr. 4, 2018 (DE) ...................... 10 2018 107 885.4
Aug. 27, 2018 (DE) ...................... 10 2018 120 880.4

(51) Int. Cl.
*B60R 21/207* (2006.01)
*B60R 21/231* (2011.01)
(Continued)

(52) U.S. Cl.
CPC ...... *B60R 21/207* (2013.01); *B60R 21/23138* (2013.01); *B60R 21/233* (2013.01);
(Continued)

(58) Field of Classification Search
CPC ............ B60R 21/207; B60R 21/23138; B60R 21/233; B60R 2021/23146;
(Continued)

(56) References Cited

U.S. PATENT DOCUMENTS 5,730,464 A    3/1998  Hill
10,023,147 B2 * 7/2018  Kwon ............... B60R 21/23138
(Continued)

FOREIGN PATENT DOCUMENTS

CN  101570172 A * 11/2009 ............... B60N 2/42
CN  108692953 A * 10/2018 ....... B60R 21/23138
(Continued)

OTHER PUBLICATIONS

T. Takano, JPH 11-278195A English Machine Translation, ip.com (Year: 1999).*
(Continued)

*Primary Examiner* — Karen Beck
(74) *Attorney, Agent, or Firm* — TAROLLI, SUNDHEIM, COVELL & TUMMINO L.L.P.

(57) ABSTRACT

A side airbag of a vehicle occupant restraint system (10) which is provided to be mounted on a vehicle seat (14) comprises an inflatable head gas cushion (18) and an inflatable torso gas cushion (20) connected to the head gas cushion (18) both of which form separate inflatable compartments of the side airbag (12). The head gas cushion (18) and the torso gas cushion (20) are formed by separate inflatable cushions which are fastened to each other in a connecting section (22). In a vehicle occupant restraint system, the side airbag (12) is mounted on a vehicle seat (14)
(Continued)

of a vehicle on the side facing a passenger seat (16) of the vehicle.

27 Claims, 7 Drawing Sheets

(51) Int. Cl.
  *B60R 21/233* (2006.01)
  *B60R 21/2338* (2011.01)
(52) U.S. Cl.
  CPC ............... *B60R 2021/23146* (2013.01); *B60R 2021/23161* (2013.01); *B60R 2021/23308* (2013.01); *B60R 2021/23316* (2013.01); *B60R 2021/23382* (2013.01)
(58) Field of Classification Search
  CPC .......... B60R 2021/23161; B60R 2021/23308; B60R 21/23
  See application file for complete search history.

(56) References Cited

U.S. PATENT DOCUMENTS

| | | | | |
|---|---|---|---|---|
| 10,814,824 | B2 * | 10/2020 | Song | B60R 21/233 |
| 10,974,686 | B2 * | 4/2021 | Moon | B60R 21/207 |
| 2011/0309603 | A1 | 12/2011 | Choi et al. | |
| 2012/0091695 | A1 * | 4/2012 | Richez | B60R 21/233 |
| | | | | 280/729 |
| 2012/0091697 | A1 | 4/2012 | Wiik et al. | |
| 2012/0126518 | A1 | 5/2012 | Fukawatase | |
| 2014/0151984 | A1 | 6/2014 | Fukawatase et al. | |
| 2015/0197209 | A1 | 7/2015 | Fujiwara | |
| 2019/0061676 | A1 * | 2/2019 | Kwon | B60R 21/233 |
| 2019/0161052 | A1 | 5/2019 | Steiner et al. | |
| 2020/0324728 | A1 * | 10/2020 | Deng | B60R 22/12 |
| 2021/0146874 | A1 * | 5/2021 | Lee | B60R 21/207 |
| 2021/0197749 | A1 * | 7/2021 | Wiik | B60R 21/207 |

FOREIGN PATENT DOCUMENTS

| | | | | |
|---|---|---|---|---|
| DE | 102009033181 B3 * | 12/2010 | | B60R 21/233 |
| DE | 102018103071 A1 * | 5/2019 | | B60R 21/23138 |
| DE | 102020213759 A1 * | 9/2021 | | B60R 21/207 |
| JP | 11278195 | 10/1999 | | |
| JP | H11278195 A | 10/1999 | | |
| JP | 3591289 B2 | 11/2004 | | |
| JP | 2014069681 | 4/2014 | | |
| WO | 9706987 | 2/1997 | | |
| WO | 2017032700 | 3/2017 | | |
| WO | WO-2021019842 A1 * | 2/2021 | | B60R 21/2338 |

OTHER PUBLICATIONS

Wahl et al. WO 2017/032700 A1 English Machine Translation, ip.com (Year: 2017).*
J. Lim, CN 10 1570172B, Lateral Gasbag System for Automobile, English Machine Translation ip.com (Year: 2013).*
Wahl et al. WO 2017/032700, Vehicle Occupant Restraint System Comprising a Central Airbag English Machine Translation ip.com (Year: 2017).*

* cited by examiner

SIDE AIRBAG AND VEHICLE-OCCUPANT RESTRAINT SYSTEM HAVING A SIDE AIRBAG

RELATED APPLICATIONS

This application corresponds to PCT/EP2018/083732, filed Dec. 6, 2018, which claims the benefit of German Applications Nos. 10 2017 129 286.1, filed Dec. 8, 2017; 10 2018 107 885.4, filed Apr. 4, 2018; and 10 2018 120 880.4, filed Aug. 27, 2018.

BACKGROUND OF THE INVENTION

The invention relates to a side airbag of a vehicle occupant restraint system that is provided to be mounted on a vehicle seat and to a vehicle occupant restraint system comprising such side airbag.

For better protecting the torso and especially the head of a vehicle occupant by an airbag, said body parts are intended to be restrained as early as possible by an airbag.

It is also known from prior art to dispose an airbag between two vehicle seats so as to prevent the vehicle occupants from colliding in the event of a lateral collision. Such airbag is also referred to as center airbag. The airbag protects the vehicle occupant assigned thereto even from over-oscillating beyond his/her seat so that the vehicle occupant will not impact on hard structures of the vehicle interior of the adjacent side.

Known center airbags, but also other side airbags, are kept in position via tethers and/or outwardly mounted positioning means to prevent the vehicle occupant e.g. form over-oscillating. Tethers and positioning means further serve for defining the inflation behavior of the airbag. The use of tethers and/or positioning means is complicated, however, and increases the space required as well as the manufacturing costs.

SUMMARY OF THE INVENTION

It is the object of the invention to provide a side airbag for vehicle occupants which requires only little space and by which quick and safe positioning in the final inflated shape thereof can be attained.

This object is achieved by a side airbag comprising the features of claim 1. The side airbag of a vehicle occupant restraint system is provided for being mounted especially on a vehicle seat, such as e.g. a driver seat of a vehicle, and includes an inflatable head gas cushion and an inflatable torso gas cushion connected to the head gas cushion, both of them forming separate inflatable compartments of the side airbag. The head gas cushion and the torso gas cushion are formed by separate inflatable cushions which are fastened to each other in a connecting section.

Said design allows to realize even complex three-dimensional shapes in the inflated condition with little effort, as the head gas cushion and the torso gas cushion are manufactured independently of each other as separate cushions. The fastening of the two cushions to each other in the connecting section allows to easily adapt the shape of the entire side airbag to the respective application.

Preferably, the head gas cushion is fastened to an upper end of the torso gas cushion. This helps form a side airbag in which the head gas cushion is connected to the torso gas cushion, when viewed in the vehicle vertical direction. The position of the inflated head gas cushion in space can be adapted, with this design, to the respective requirements without difficulties by attaching the head gas cushion to the torso gas cushion in the appropriate orientation.

Alternatively, the head gas cushion may be fastened in an upper end section on a side of the torso gas cushion close to the vehicle occupant. This helps form a side airbag in which, in the vehicle vertical direction and when viewed from the front, the head gas cushion is connected to the torso gas cushion as an element extending the torso gas cushion upwards and toward the vehicle occupant. The upper end section of the side of the torso gas cushion close to the vehicle occupant preferably describes the upper 40%, especially the upper 20% to 35%, of the longitudinal extension of the torso gas cushion in the vehicle vertical direction.

Above all, a curved shape of the inflated side airbag can thus be easily achieved, although both the head gas cushion and the torso gas cushion may have a simple cushion shape comprising e.g. merely two connected cut parts.

The side airbag includes especially a constriction between the head gas cushion and the torso gas cushion that is formed by the connecting section.

Both the head gas cushion and the torso gas cushion may be elongate flat cushions the inflated thickness of which is e.g. significantly smaller than their length from their lower end to their upper end in the mounted and inflated condition of the side airbag.

The outer wall of the respective gas cushion in this case has an outer wall portion close to the vehicle occupant in the inflated condition of the side airbag and an outer wall portion far from the vehicle occupant, the distance of said outer wall portions defining the thickness of the inflated side airbag.

As a result, an elongate, optionally curved, but in total flat side airbag is formed, when both cushions are interconnected in the edge sections of the outer wall portions. It would also be imaginable, however, to dispose the head gas cushion quasi transversely and to connect it on a surface of the outer wall portion close to the vehicle occupant to the upper end of the torso gas cushion so as to impart a complex three-dimensional configuration to the side airbag. It is further imaginable to dispose the head gas cushion in an upper end section of the torso gas cushion. In such embodiment, preferably the outer wall portion far from the vehicle occupant of the head gas cushion, especially an edge section of the outer wall portion far from the vehicle occupant of the head gas cushion, is connected to the outer wall portion close to the vehicle occupant of the torso gas cushion.

Preferably, the head gas cushion is connected to the torso gas cushion so that, in the inflated condition of the side airbag, the head gas cushion is bent vis-à-vis the torso gas cushion. This shape can be obtained by basically obliquely attaching and connecting two separate cushions to each other. Advantageously, the angle is selected so that the head gas cushion in the inflated condition is inclined toward the assigned vehicle seat so that the head of the vehicle occupant in the vehicle seat can be absorbed early and gently.

In general, this allows to achieve that an occupant side of the side airbag formed by the outer wall portions close to the vehicle occupant of the head gas cushion and of the torso gas cushion extends in a concavely curved manner.

This shape of the side airbag causes the head gas cushion to be positioned toward the vehicle occupant during inflation already so that early and gently contact can be established with the occupant.

A head gas cushion whose outer wall portion far from the vehicle occupant is connected to the outer wall portion close to the vehicle occupant of the torso gas cushion further results in the advantage that the head gas cushion in the deployed and filled condition can bear against the upper end section of the torso gas cushion which is located above the connecting section in the vehicle vertical direction.

The outer wall of the head gas cushion may include two outer wall portions interconnected along a peripheral line. Said peripheral line defines a head gas cushion parting plane. Correspondingly, the outer wall of the torso gas cushion may include two outer wall portions interconnected along a peripheral line, the peripheral line defining a torso gas cushion parting plane. The head gas cushion parting plane is preferably inclined at an angle of about 20° to 90° vis-à-vis the torso gas cushion parting plane.

The peripheral line is formed by the connection of the outer wall portions into a cushion shape. In the simplest case, two separate outer wall portions are provided which are interconnected along their edges in the peripheral line so as to form a cushion. One variant provides only one single cut part for each gas cushion that is folded once back onto itself so that two superimposed outer wall portions are formed which are interconnected at the free edges, thus forming the cushion. The connection of the edges may be made in any proper way, especially by stitching, gluing or welding. It is also possible, of course, to produce the two outer wall portions in a joint weaving operation in which the entire cushion is woven in one piece and warp and weft threads of the outer wall portions merge into a joint peripheral line at the edges of the outer wall portions.

For bending the head gas cushion relative to the torso gas cushion, the connecting section between the head gas cushion and the torso gas cushion is advantageously located on the side close to the vehicle occupant of the parting planes of the two gas cushions. This results in curvature of the inflated side airbag toward the vehicle occupant, when viewed along the vehicle vertical direction.

As an alternative, the head gas cushion can be bent relative to the torso gas cushion by the connecting section between the head gas cushion and the torso gas cushion being located at the torso gas cushion in an upper end section on the side close to the vehicle occupant of the parting plane of the torso gas cushion, whereas at the head gas cushion the connecting section is located on the side far from the vehicle occupant of the parting plane of the head gas cushion. Thus, during inflation of the side airbag, the head gas cushion is pressed toward the vehicle occupant (when viewed along the vehicle vertical direction), which equally results in a curvature of the inflated side airbag toward the vehicle occupant. In the vehicle vertical direction, the connecting section is preferably located in the upper 40% of the torso gas cushion. In preferred embodiments, the connecting section is especially located in the upper third and/or in the area of the upper 25% to 35% of the torso gas cushion. Each of the % values relates to a length of the torso gas cushion in the vehicle vertical direction.

An extension of the head gas cushion and the torso gas cushion along the respective parting plane, when viewed in the vehicle longitudinal direction, is preferably larger than a thickness of the inflated head or torso gas cushion, i.e. larger than the distance of the respective outer wall portions.

It is possible to manufacture the side airbag so that all cut parts of the outer wall portions can be separately flatly spread. Basically, the entire side airbag could be formed of only two cut parts one of which forms the head gas cushion and the other forms the torso gas cushion. It is also possible, of course, to impart a three-dimensional shape to the outer wall portions, for example by introducing gathered seams or darts to originally flat cut parts or by weaving the two cushions three-dimensionally from the start.

Moreover, a three-dimensional shape can be imparted to the outer wall portions of the torso gas cushion and/or of the head gas cushion by one or more shaping tethers introduced to the respective gas cushion.

It is further possible that at least one outer wall portion and/or one cut part of the head gas cushion and/or of the torso gas cushion comprises a shaping portion. Such shaping portion may help adapt the thickness of the head gas cushion and/or of the torso gas cushion, for example, to increase an impact surface for the vehicle occupant or to improve vehicle occupant restraint. For example, such shaping portion may help change the shape and the thickness of the head gas cushion and/or the torso gas cushion even in portions only.

Moreover, the head gas cushion and/or the torso gas cushion may be provided to include, by a shaping tether and/or a shaping portion, in a section forward in the vehicle longitudinal direction a bulging deformation by which the respective gas cushion is partially thickened in the front section.

The shaping tether is preferably disposed, in the head gas cushion and/or the torso gas cushion, behind the section including the bulged deformation and the resulting partial thickening. By the at least one shaping tether the outer wall portions close to the vehicle occupant and far from the vehicle occupant of the head gas cushion and/or of the torso gas cushion are held together partially more closely in this section so that the bulged deformation is especially formed in the front section.

In the head gas cushion such bulged deformation may serve, especially in an oblique frontal collision, for establishing an early contact with the occupant and limiting a forward movement of the vehicle occupant along the side airbag. Alternatively, or additionally, also such bulged deformation of the torso gas cushion may serve, especially in oblique frontal collision, for establishing an early and gentle contact with the occupant and for limiting a forward movement of the vehicle occupant along the side airbag. Thus, especially by such side airbag the movement of the vehicle occupant both in the vehicle transverse direction and in the vehicle longitudinal direction can be limited in the situation of restraint.

Apart from an enlarged impact surface, such shaping may also be utilized e.g. for stabilizing the side airbag.

Alternatively, and/or additionally, the shaping can be brought about by the shaping portion. Such shaping portion is preferably formed integrally with the respective cut part and/or outer wall portion so that the cut part and/or the outer wall portion initially can be flatly spread.

Preferably, the cut part comprising the shaping portion is larger in the flatly spread state than the cut part to which it is connected along the peripheral line to form the head gas cushion or the torso gas cushion. In such embodiment, preferably a respective one of the outer wall portions is formed by one of the cut parts. For enabling the cut parts to be connected, initially outer edges of the shaping portion are interconnected in the area of connecting portions so that, in a top view, the cut part has substantially the same cut shape as the cut part without the shaping portion. Then the cut parts can be interconnected along the peripheral line. Alternatively, connecting the connecting portions of the shaping portion and connecting the cut parts along the peripheral line may be performed in one working step.

If the head gas cushion or the torso gas cushion is made from one single cut part, the shaping portion is arranged in an area forming one of the two outer wall portions. In order to connect the two areas of the cut part that form the outer wall portions to each other, the connecting portions of the shaping portion are interconnected such that the areas of the cut part forming the outer wall portions can be interconnected along the peripheral line. Connecting the connecting portions and the areas of the cut part forming the outer wall portions may be take place in successive separate working steps or during the same working step.

It is equally imaginable to provide non-inflatable sections in which for example opposite outer wall portions are interconnected while being directly superimposed in one or both of the gas cushions so as to increase the stability of the side airbag and to obtain individual forming.

Furthermore, an upper edge of the head gas cushion (relating to the inflated condition of the side airbag) may have a concave curvature. The concave curvature is configured especially such that the length of the trailing edge of the head gas cushion facing the vehicle occupant is shorter than the length of the leading edge of the head gas cushion facing away from the vehicle occupant. Alternatively, the length of the trailing edge of the head gas cushion facing the vehicle occupant moreover may be shorter than the length of the leading edge of the head gas cushion facing away from the vehicle occupant, the upper edge being substantially configured as a straight line without any curvature.

Such configuration, especially a concavely curved forming of the upper edge of the head gas cushion may help, for example during oblique frontal collision, to establish an early gentle contact with the vehicle occupant and to limit a forward movement of the vehicle occupant along the side airbag.

The inflatable volume of the head gas cushion may be smaller than that of the torso gas cushion.

Advantageously, the connecting section has at least one overflow orifice that fluidically connects the head gas cushion to the torso gas cushion so that both cushions can be filled through one single inflator. The connecting section further may include plural overflow orifices arranged especially along a substantially straight line.

The connecting section between the head gas cushion and the torso gas cushion may especially take an elongate shape. A longitudinal axis of the connecting section substantially corresponding to a line that connects the two points of the connecting section which are most distant from each other constitutes a pivot axis in typical embodiments of the side airbag. During deployment and filling of the side airbag, the head gas cushion swivels about the pivot axis to the position bent vis-à-vis the torso gas cushion.

The pivot axis formed by the connecting section between the torso gas cushion and the head gas cushion is preferably arranged at an angle from 20° to 90° with the vehicle vertical axis. Especially in one embodiment in which the head gas cushion is arranged at an upper edge section of the torso gas cushion, the pivot axis is preferably arranged at an angle from 85° to 90° with the vehicle vertical axis. Particularly in an embodiment in which the head gas cushion is arranged at an upper end section of the torso gas cushion, the pivot axis is preferably arranged at an angle from 30° to 70°, preferably from 40° to 55°, with the vehicle vertical axis. Especially by arranging the pivot axis at an angle of less than 90°, the connecting section directed obliquely forwardly downward in the inflated condition (relating to the vehicle vertical and longitudinal directions) may help establish early contact between the side airbag and the shoulder and arm area of the vehicle occupant.

Furthermore, the side airbag may comprise a positioning element. In a typical embodiment, the positioning element is fastened both to the torso gas cushion and to the head gas cushion of the side airbag. The positioning element may be, for example, a fabric element which is fastened, relating to the inflated condition of the side airbag, to a leading edge at the peripheral line of each of the torso gas cushion and the head gas cushion. The positioning element may be a one-part or multi-part element. For example, the positioning element may consist of two fabric elements that are interconnected by a connecting line. By arranging the connecting line of the fabric elements, the positioning of the head gas cushion relative to the torso gas cushion can additionally be influenced.

The positioning and/or the location of the head gas cushion relative to the torso gas cushion can be especially optimized and/or stabilized by the positioning element. For example, a positioning element can help minimize the risk of buckling of the head gas cushion.

The object according to the invention is also achieved by a vehicle occupant restraint system comprising the features of claim 19 in which a side airbag as afore-described is mounted as a center airbag on a driver seat of a vehicle on the side facing a passenger seat of the vehicle. Thus, the side airbag does not only offer a protective effect to the driver but also prevents any contact between the driver and the front passenger.

The torso gas cushion advantageously includes an injecting portion which is fixed to a backrest, especially to a side face of a seat, of a vehicle seat assigned to the vehicle occupant and via which the entire side airbag is fastened on the vehicle seat.

Typically, just as for known side airbags, a mounting space is provided inside the backrest of a vehicle seat. The mounting space may be located in the area of a medium height of a side face of the seat, when mounting takes place at sitting areas having separate vehicle seats. Alternatively, the mounting space may also be provided at a central armrest of a continuous bench.

It is possible to design the side airbag without any outer stabilizing straps or other outwardly attached positioning means and to fix the side airbag on the vehicle side especially only in the area of the injection mouth.

Designations such as "downward" and "upward" are always referred to a consideration along the vehicle vertical direction.

DESCRIPTION OF THE DRAWINGS

In the following, the invention shall be described in greater detail by way of an example embodiment and with reference to the attached drawings, wherein:

FIGS. 9a) and b) show a schematic front view of another embodiment of a completely inflated side airbag according to the invention of a vehicle occupant restraint system according to the invention at different times in a situation of restraint;

FIGS. 12a) and b) are schematic representations of an embodiment of cut parts of a head gas cushion of the side airbag according to the invention as set forth in FIG. 4;

FIGS. 13a), b) and c) are schematic representations of another embodiment of cut parts of a head gas cushion for a side airbag according to the invention of a vehicle occupant restraint system according to the invention.

DESCRIPTION

The Figures illustrate a vehicle occupant restraint system 10 comprising a side airbag 12 that is arranged on a backrest of a vehicle seat 14, in this case on a vehicle seat 14 (partly indicated in the Figures) on the side facing a passenger seat 16.

The side airbag 12 includes an inflatable head gas cushion 18 and an inflatable torso gas cushion 20 connected downwards thereto along a vehicle vertical direction V. Each of the head gas cushion 18 and the torso gas cushion 20 forms an inflatable compartment of the side airbag 12. The head gas cushion 18 constitutes an upper end of the side airbag 12 in the mounted and inflated condition of the side airbag 12.

The head gas cushion 18 and the torso gas cushion 20 are formed by separate prefabricated inflatable cushions which are fastened to each other in a connecting section 22 so that the head gas cushion 18 is attached in the area of an upper end 24 of the torso gas cushion 20.

The connecting section 22 includes at least one overflow orifice 26 fluidically connecting the head gas cushion 18 to the torso gas cushion 20 and allowing filling gas to overflow from the torso gas cushion 20 into the head gas cushion 18.

In this example, the head gas cushion 18 and the torso gas cushion 20 are attached to each other by sewing in the connecting section 22, the seamline enclosing the overflow orifice 26 and sealing it from the environment of the side airbag 12 in a gastight manner.

In the embodiment illustrated in the Figures, the head gas cushion 18 is obliquely attached to the torso gas cushion 20 so that, in the inflated condition of the side airbag 12, it is bent vis-à-vis the torso gas cushion 20 toward a head of a vehicle occupant 28 seated on the vehicle seat 14.

Both the head gas cushion 18 and the torso gas cushion 20 in this case are substantially flat cushions, each having an outer wall portion 30a, 30b close to the vehicle occupant and facing the vehicle occupant 28 and an outer, wall portion 32a, 32b far from the vehicle occupant and facing away from the vehicle occupant 28. Here, the reference numerals 30a, 32a are associated with the head gas cushion 18, while the reference numerals 30b, 32b refer to the torso gas cushion 20.

Therefore, an occupant side 34 of the side airbag 12 formed of the two outer wall portions 30a, 30b close to the vehicle occupant extends to be concavely curved toward the vehicle occupant 28.

A thickness dT of the torso gas cushion 20 and, resp., dK of the head gas cushion 18 that is defined as a distance between the respective outer wall portions 30a, 32a and 30b, 32b is definitely smaller in this example than a longitudinal extension of the outer wall portions 30a, 32a and, resp., 30b, 32b.

The outer wall portions 30a, 32a of the head gas cushion 18 are interconnected along a first peripheral line 36a. The peripheral line 36a is circumferential in the case of a flat cushion in the area of the maximum periphery of the cushion. The first peripheral line 36a defines a head gas cushion parting plane EK. The outer wall portions 30b, 32b of the torso gas cushion 20 are correspondingly interconnected along a second peripheral line 36b defining a torso gas cushion parting plane ET.

Since the head gas cushion 18 is arranged to be inclined toward the vehicle occupant 28, the head gas cushion parting plane EK is located at an angle α from about 20° to 90° with the torso gas cushion parting plane ET, the angle α opening toward the vehicle occupant 28.

In a possible example, each of the outer wall portions 30a, 32a and the outer wall portions 30b, 32b are separate cut parts, the outer wall portions 30a, 32a being interconnected along the first peripheral line 36a and forming the head gas cushion 18, while the outer wall portions 30b, 32b being interconnected along the second peripheral line 36b and forming the torso gas cushion 20.

Figure 1:
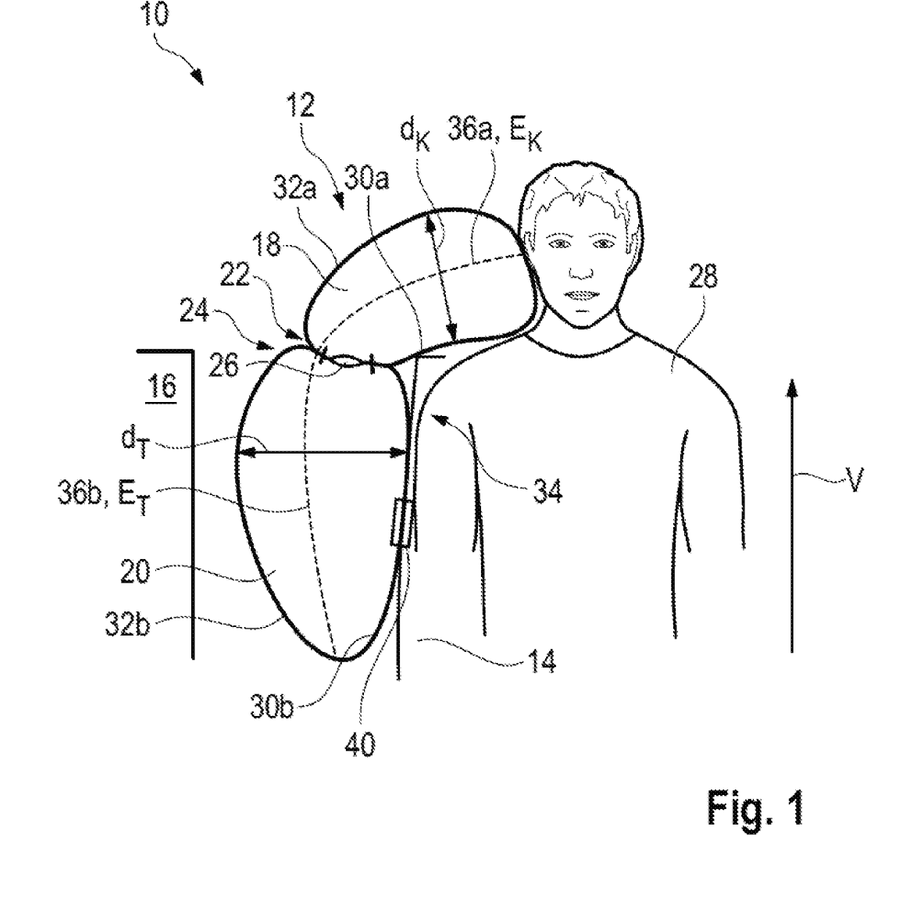
FIG. 1 is a schematic sectional view of a completely inflated side airbag according to the invention of a vehicle occupant restraint system according to the invention.
Figure 2:
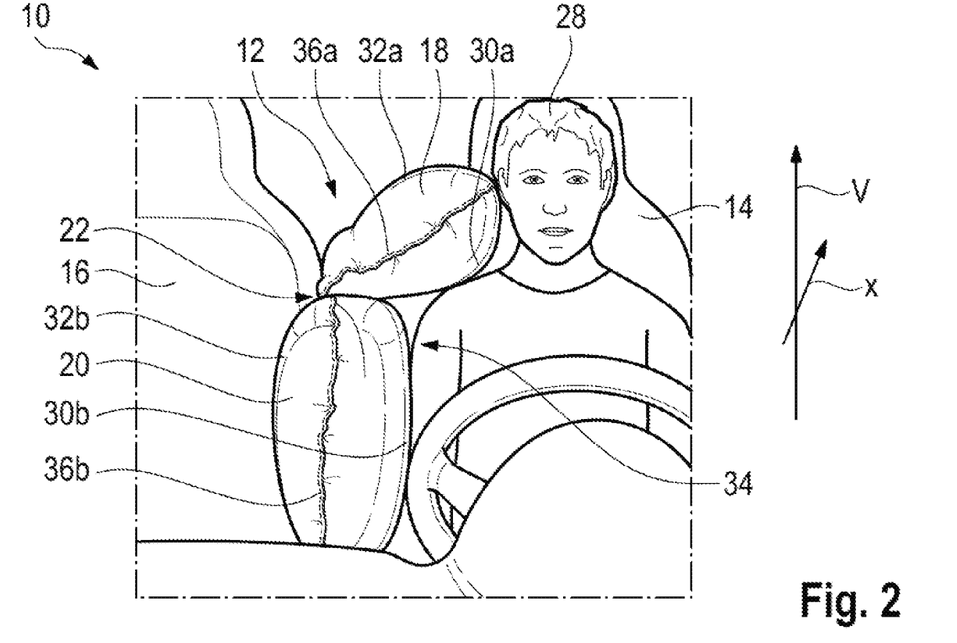
FIG. 2 is a schematic perspective representation of the vehicle occupant restraint system from FIG. 1 in a front view.
Figure 3:
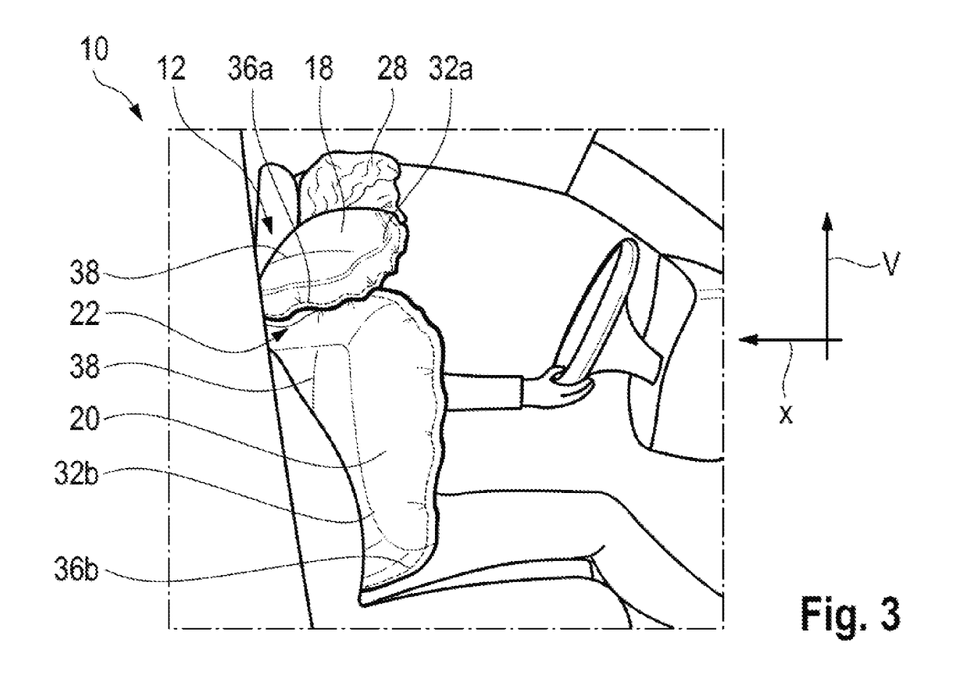
FIG. 3 shows the vehicle occupant restraint system from FIG. 2 in a lateral view.

The torso gas cushion parting plane ET in this case is approximately in parallel to the vehicle vertical plane V as well as approximately in parallel to the vehicle longitudinal direction x (viz. directed into the image plane in FIG. 1, cf. also FIGS. 2 and 3).

In the embodiment shown here, the connecting section 22 is located on the outer wall portions 30a, 30b, i.e. in the area of each of the head gas cushion 18 and the torso gas cushion 20 which is located on the side of the parting planes EK, ET facing the vehicle occupant 28 and the vehicle seat 14.

The connecting section 22 is provided on the surface of each of the outer wall portions 30a, 30b.

However, it would also be possible to arrange the connecting section 22 e.g. at the second peripheral line 36b of the torso gas cushion 20 and on the surface of the outer wall portion 30a of the head gas cushion 18 or at the first peripheral line 36a of the head gas cushion 18 and on the surface of the outer wall portion 30b of the torso gas cushion 20, which would equally result in the head gas cushion 18 being bent vis-à-vis the torso gas cushion 20.

For manufacturing the side airbag 12, the head gas cushion 18 and the torso gas cushion 20 are separately prefabricated, e.g. by connecting their respective outer wall portions 30a, 32a and 30b, 32b to the respective peripheral lines 36a, 36b. Subsequently, the head gas cushion 18 and the torso gas cushion 20 are fastened to each other in the desired spatial alignment of the head gas cushion 18 in the connecting section 22, with the overflow orifice 26 being also disposed in the connecting section 22.

As is evident especially from FIGS. 2 and 3, in this example the volume of the head gas cushion 18 is larger than that of the torso gas cushion 20.

In the inflated condition of the side airbag 12, the connecting section 22 between the torso gas cushion 20 and the head gas cushion 18 in this case is approximately level with a shoulder of the vehicle occupant 28 (relating to a 95% dummy). The head gas cushion 18 is inclined toward the head of the vehicle occupant 28 above the shoulder.

Both the head gas cushion 18 and the torso gas cushion 20 in this example have a stabilizing non-inflatable area 38 (see FIG. 3) in which the outer wall portions 30a, 32a and, resp., 30b, 32b are directly interconnected.

In this embodiment, neither inside nor outside the gas cushions 18, 20 are provided any tethers, stabilizers or further inflatable compartments. However, it is easily possible to provide fastening straps located outside the head gas cushion 18 and the torso gas cushion 20, for example, which connect the torso gas cushion 20 to the vehicle seat 14 so as to increase the stability of the side airbag 12.

Further, instead of the non-inflatable sections 38 in the head gas cushion and/or in the torso gas cushion, a shaping and preferably stabilizing tether may be disposed.

The side airbag 12 is filled, as conventionally known, via an inflator that is arranged at a mounting position approximately at half height of a backrest of the vehicle seat 14, relating to the vehicle vertical direction V, where also a receptacle for the folded side airbag 12 is located. The side airbag 12 is housed in said receptacle prior to deployment thereof, wherein it is fixed to the vehicle seat 14 by an injection portion 40 (only indicated in FIG. 1).

During inflation, the entire side airbag 12 is aligned with the vehicle occupant 28 due to the head gas cushion 18 obliquely attached to the torso gas cushion 20, without any tensile force having to be exerted on the head gas cushion 18, as this corresponds to the natural configuration of the side airbag 12 predetermined by the shape of the outer wall portions 30a, 30b, 32a, 32b.

The filling rate of the head gas cushion 18, for example, can be adapted via the size and the design of the at least one overflow orifice 26.

Figure 4:
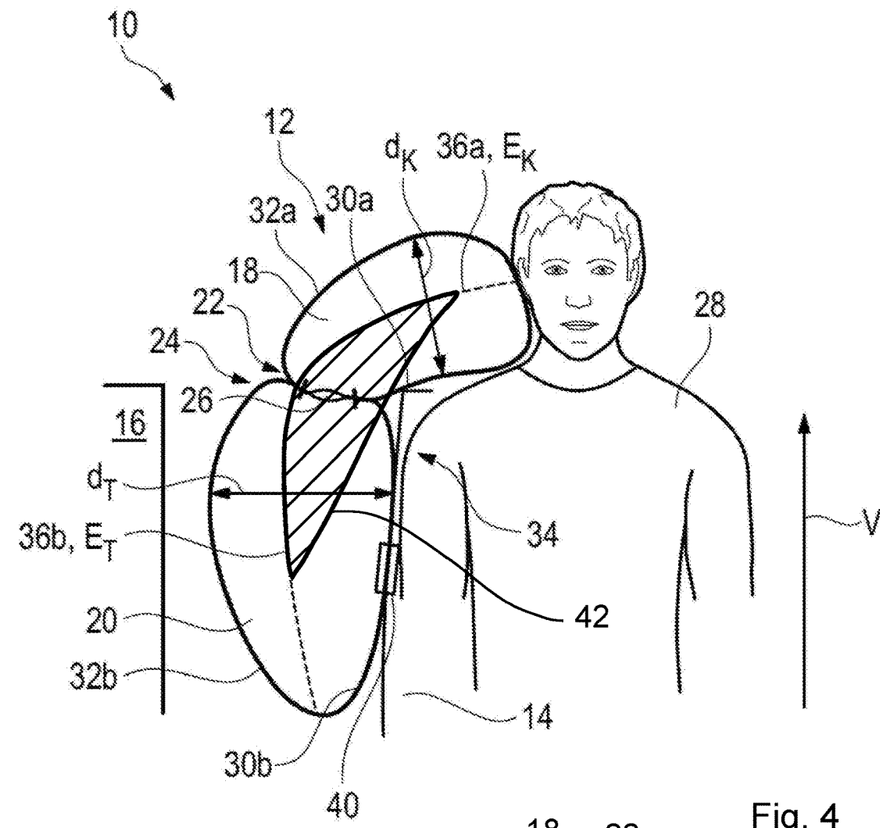
FIG. 4 is a schematic front view of another embodiment of a completely inflated side airbag according to the invention of a vehicle occupant restraint system according to the invention.

FIG. 4 illustrates the vehicle occupant restraint system 10 showing a second embodiment of the side airbag 12. The side airbag 12 of FIG. 4 substantially corresponds to the afore-described side airbag 12. In the following, only differences in the embodiments shall be emphasized and described in detail.

The side airbag 12 illustrated in FIG. 4 includes a positioning element 42. The positioning element 42 (shown in hatched lines) in the shown embodiment is a fabric element which is connected to the head gas cushion 18 and the torso gas cushion 20 in the area of the peripheral line 36a and 36b. The positioning element 42 especially configured as fabric element is disposed and fastened at the leading edge formed by the peripheral line 36a and 36b on each of the head gas cushion 18 and the torso gas cushion 20 (relating to the vehicle longitudinal direction x according to FIG. 3).

Figure 5:
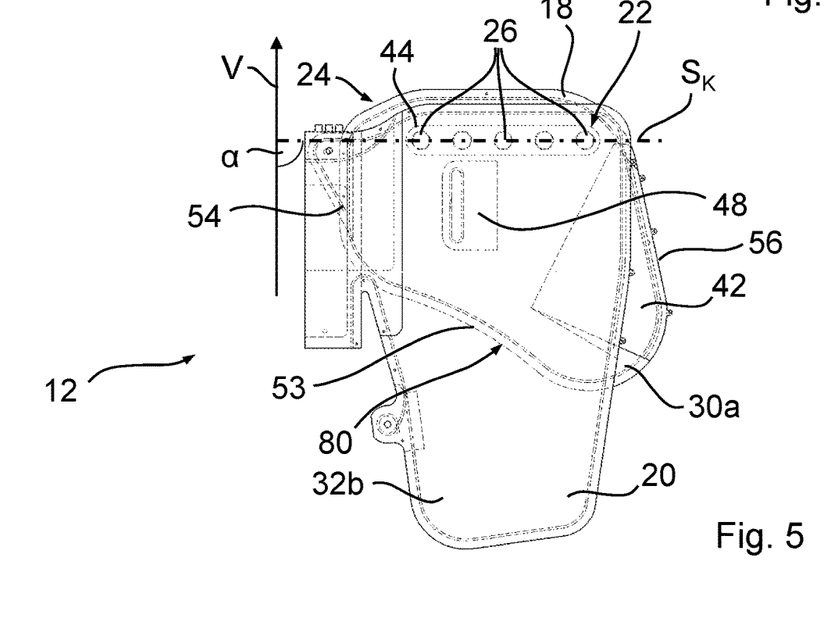
FIG. 5 is a schematic view of an embodiment of a flatly spread non-inflated side airbag according to the invention.

FIG. 5 illustrates an embodiment of a side airbag 12 according to the invention comprising a positioning element 42 in a non-inflated and flatly spread condition. The head gas cushion 18 is fastened to the upper end 24 of the torso gas cushion 20 via a seam 44. The overflow orifices 26 are disposed in the connecting section substantially along a straight line forming a pivot axis SK. During inflation and filling of the side airbag 14, the head gas cushion 18 swivels about the pivot axis SK into the position directed toward the vehicle occupant 28 as shown in FIG. 4, for example. The pivot axis SK is arranged, in the shown embodiment, at an angle $\alpha$ of about 90° with the vehicle vertical axis V. The positioning element 42 may help additionally optimize and/or stabilize the positioning and/or the position of the head gas cushion relative to the torso gas cushion.

FIG. 5 further illustrates that the upper edge 53 of the head gas cushion 18 of the side airbag 12 has a concave curvature 80. In an inflated condition of the side airbag 12, the upper edge 53 corresponds to the top edge of the head gas cushion 18. In addition, the trailing edge 54 of the head gas cushion 18 has a smaller length than the leading edge 56 of the head gas cushion 18. In FIGS. 12a) and b), the cut parts 50a and 52a are schematically shown with possible further contours of the upper edge 53 of the head gas cushion 18. On the one hand, a contour of the upper edge 53 is shown without a concave curvature (continuous line) and, on the other hand, a contour of the upper edge is shown with a strong concave curvature 80 (broken line).

Such forming can help, for example in the event of an oblique frontal collision, establish early contact with the vehicle occupant 28 and limit forward movement of the vehicle occupant 28 along the side airbag 12.

Figure 6:
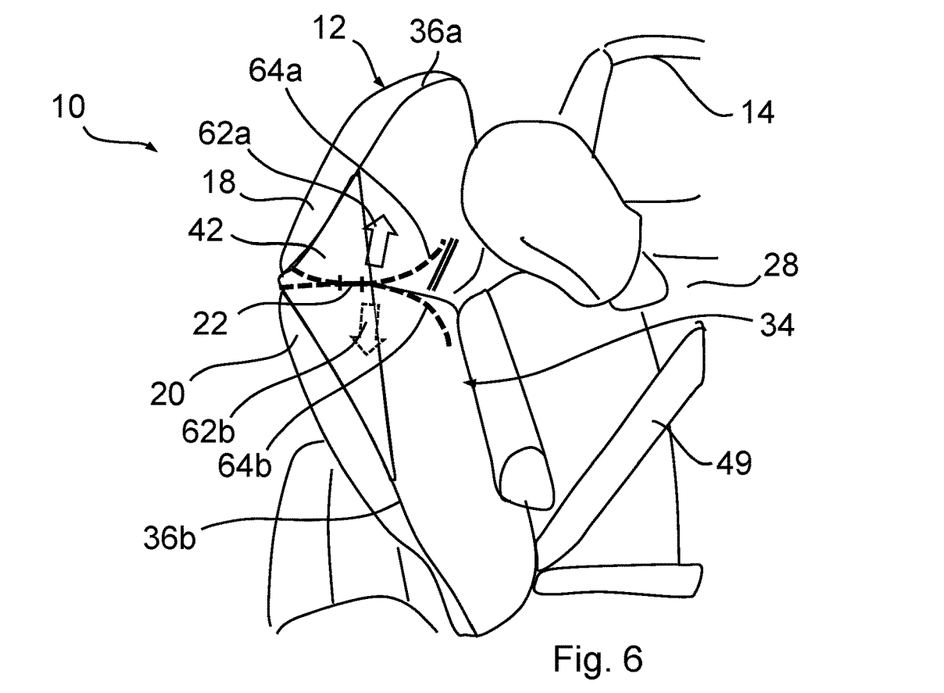
FIG. 6 is a schematic front view of an embodiment of a completely inflated side airbag according to the invention of a vehicle occupant restraint system according to the invention in a situation of restraint.

FIG. 6 illustrates the side airbag 14 comprising the positioning element 42 in a situation of restraint in the inflated and deployed condition. The arrows 62a and 62b show that in the area of the connecting section 22 the curved outer contours 64a of the head gas cushion 18 and 64b of the torso gas cushion 20 support rotation or swiveling of the head gas cushion 18 about the pivot axis SK during inflation and deployment of the side airbag 14.

Figure 7:
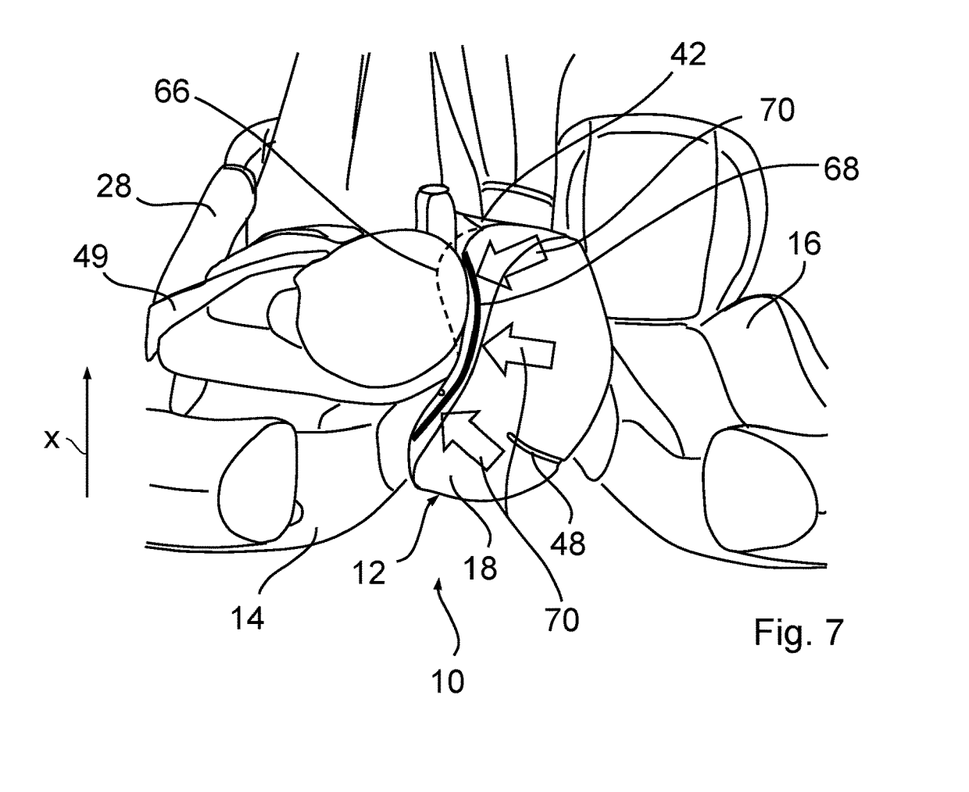
FIG. 7 is a schematic top view of the side airbag of the vehicle restraint system according to FIG. 6.

In FIG. 7, the vehicle occupant restraint system 12 from FIG. 6 is shown in a top view. In the head gas cushion 18 a shaping tether 48 (see also FIG. 5) is integrated. The shaping tether 48 helps to produce a bulged deformation 66 (shown in broken lines in FIG. 7) at the head gas cushion 18 toward the leading edge. The bulged deformation 66 can help establish early contact of the vehicle occupant 28 (in the Figures partly shown as a dummy) with the head gas cushion 18 and limit a forward movement of the vehicle occupant 28 along the head gas cushion 18 in a situation of restraint caused by oblique frontal collision, for example. Upon impact of the vehicle occupant, the head gas cushion 18 can adopt the contour shown by the line 68, for example, and, as afore-described, can limit the forward movement of the vehicle occupant 28 along the outer wall portion 30a close to the vehicle occupant of the head gas cushion. The limitation of the movement of the vehicle occupant 28 by the side airbag 14 is schematically shown by the arrows 70.

Figure 8:
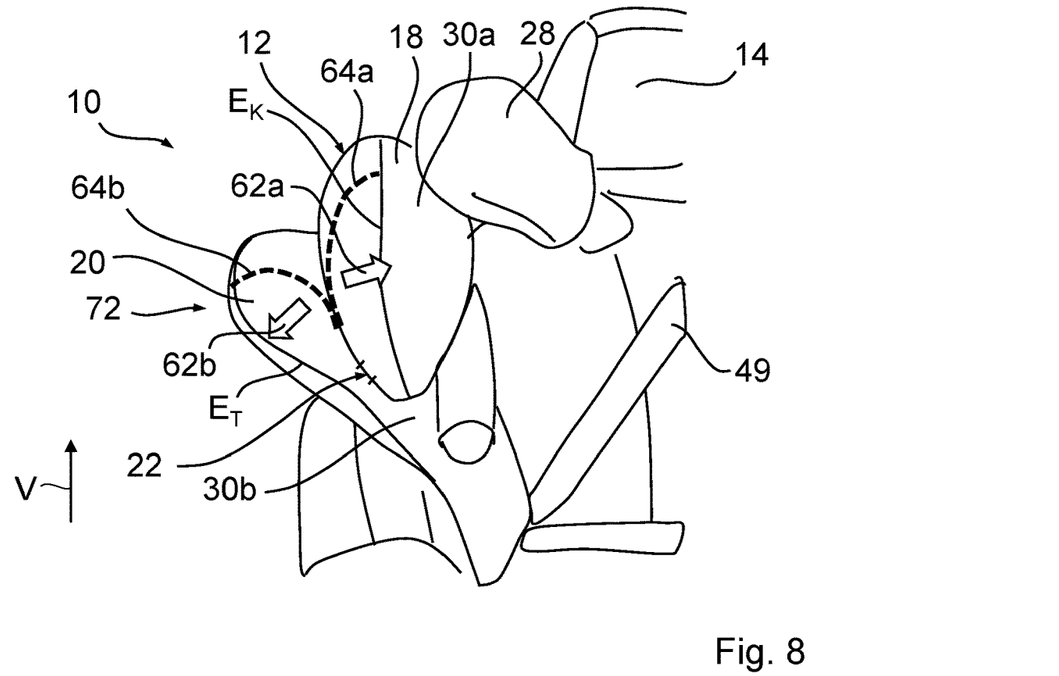
FIG. 8 is a schematic front view of another embodiment of a completely inflated side airbag according to the invention of a vehicle occupant restraint system according to the invention in a situation of restraint.

In FIG. 8 another embodiment of a side airbag 12 according to the invention is illustrated. The side airbag 12 differs from the afore-shown side airbags 12 by the fact that the connecting section 22 is located between the head gas cushion 18 and the torso gas cushion 20 in such embodiment at the head gas cushion 18 on the side of the parting plane EK far from the vehicle occupant on the outer wall portion 32a far from the vehicle occupant. In addition, the connecting section 22 is located in an upper end section 72 of the torso gas cushion 20. The upper end section 72 of the torso gas cushion 20 preferably describes the upper 40% of the torso gas cushion 20, especially the upper third (when viewed in the vehicle vertical direction V).

The arrows 62a and 62b show that even in such embodiment the curved outer contour 64a of the head gas cushion 18 and 64b of the torso gas cushion 20 supports rotation and, resp., swiveling of the head gas cushion 18 about the pivot axis SK (see FIG. 11) during inflation and deployment of the side airbag 14. The additional airbag volume of the torso gas cushion 20 disposed in the upper end section 72 above the connecting section 22 may allow an additional support element for the head gas cushion 18 to be provided in the shown situation of restraint. Especially by the upper end section 72 of the torso gas cushion 20 the positioning and/or the position of the head gas cushion 18 relative to the torso gas cushion 20 can be additionally optimized and/or stabilized. For example, in the situation of restraint, the head gas cushion 18 can thus be prevented from "buckling" to the side by the upwardly protruding end section 72 of the torso gas cushion 20.

In FIGS. 9a) and b), another embodiment of a side airbag 12 according to the invention of a vehicle occupant restraint system 10 according to the invention is shown at different times in a situation of restraint. In FIG. 9a), the vehicle occupant restraint system 10 is shown at the beginning of the situation of restraint, immediately after the side airbag 12 has been completely deployed and inflated. In FIG. 9b), the vehicle occupant restraint system 10 is shown at a later time in the situation of restraint at which the vehicle occupant 28 is restrained by the side airbag 12.

Figure 9:
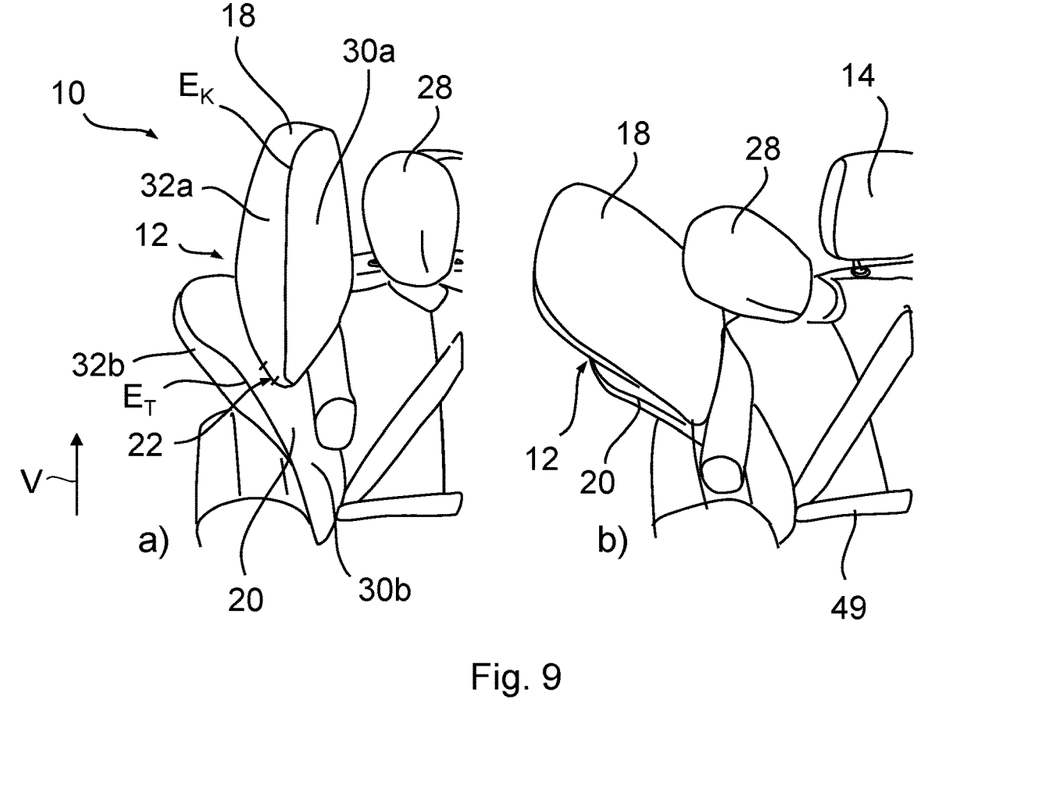

The connecting section 22 between the head gas cushion 18 and the torso gas cushion 20 in this embodiment of the side airbag 12 is equally located at the head gas cushion 18 on the side of the parting plane EK far from the vehicle occupant 28 on the outer wall portion 32a far from the vehicle occupant. The connecting section in this embodiment is located at the torso gas cushion 20 in the upper end section 72 on the side of the parting plane ET close to the vehicle occupant on the outer wall portion 30b close to the vehicle occupant. The side airbag 12 of FIG. 9 differs from the side airbag of FIG. 8 by a larger head gas cushion 18. The head gas cushion 18 has a larger expansion especially in the vehicle vertical direction V, which allows to enlarge the protective area for avoiding interaction with adjacent vehicle components or with another vehicle occupant on a passenger seat 16, for example.

Figure 10:
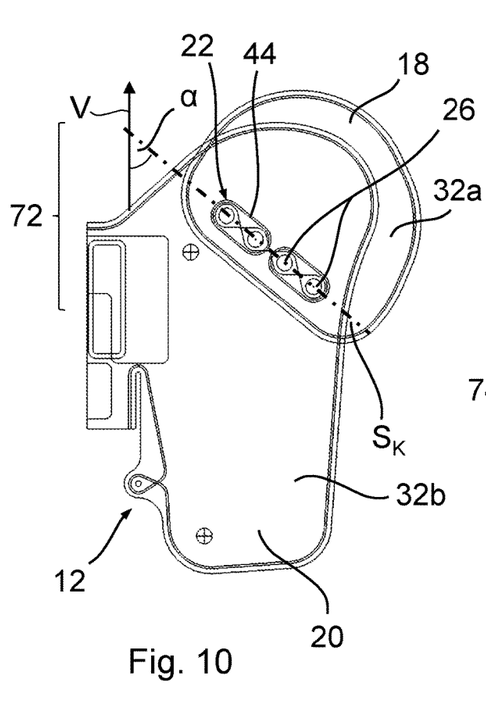
FIG. 10 is a schematic view of another embodiment of a flatly spread non-inflated side airbag according to the invention.

In FIG. 10, an embodiment according to the invention of a side airbag 12 is illustrated in a non-inflated and flatly spread condition. In contrast to the embodiment according to FIG. 5 in which the connecting section 22 is located at the head gas cushion 18 on the outer wall portion 30a close to the vehicle occupant, the connecting section 22 of the side airbag 12 according to FIG. 10 is located at the head gas cushion 18 on the outer wall portion 32a far from the vehicle occupant.

The pivot axis SK of the side airbag 12 in the shown embodiment is disposed at an angle α of about 50° with the vehicle vertical axis V.

Figure 12:
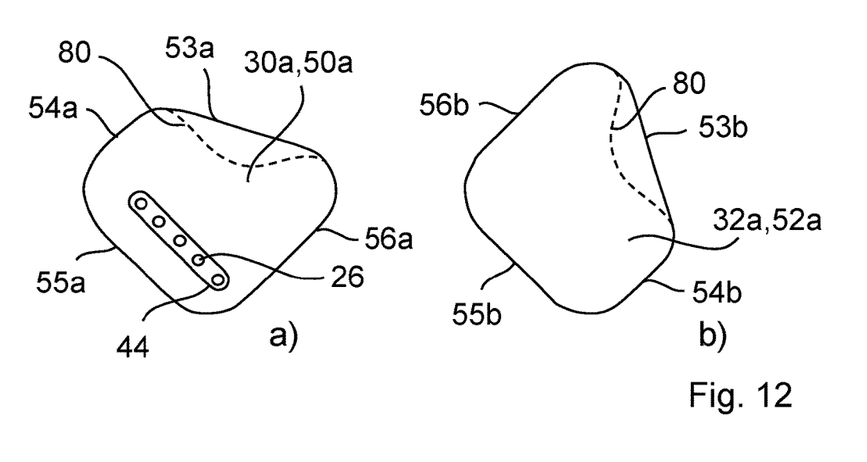

Alternatively to the head gas cushion 18 shown in FIG. 10, the side airbag 12 may equally have a head gas cushion 18 that has a contour according to a head gas cushion 18 formed by the cut parts 50a and 52a shown in FIG. 12. The overflow orifices 26 are disposed, in such embodiment, in the outer wall portion 32 far from the vehicle occupant which is formed by the cut part 52a.

Figure 11:
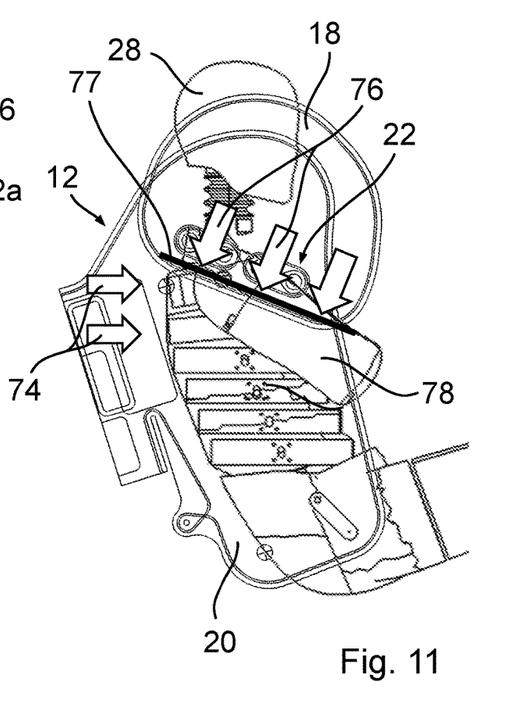
FIG. 11 is a schematic lateral view of the flatly spread non-inflated side airbag according to FIG. 10 in a location positioned facing a vehicle occupant.

FIG. 11 illustrates the side airbag 12 from FIG. 10 positioned relative to the vehicle occupant 28 (shown by a dummy) in a flatly spread non-inflated condition. The arrangement of the connecting section 22 and the pivot axis SK inclined about the angle α helps provide a contour shown by the line 77 at the side airbag 12, which contour may limit a forward movement (shown by the arrows 74) of the vehicle occupant 28 by "arresting" the shoulder and arm area 78. Due to the inclined arrangement of the lower edge of the head gas cushion 18 in the connecting section 22, in a situation of restraint the head gas cushion exerts a force (schematically shown by the arrows 76) limiting the forward movement on the shoulder and arm area 78 of the vehicle occupant 28. Thus, accelerations acting on the vehicle occupant 28, for example, may be additionally minimized in the situation of restraint.

FIGS. 12a) and b) schematically illustrate the cut parts 50a and 52a of the head gas cushion 18 of the preceding Figures. For forming the head gas cushion 18, the cut parts 50a and 52a are interconnected, for example sewn, along the peripheral line portions 53a to 56a and 53b to 56b. During connection, the peripheral line portion 53a is connected to the peripheral line portion 53b, the peripheral line portion 54a is connected to the peripheral line portion 54b, the peripheral line portion 55a is connected to the peripheral line portion 55b and the peripheral line portion 56a is connected to the peripheral line portion 56b. The cut parts 50a and 52a constitute the outer wall portions 30a and 32a of the head gas cushion 18 in the shown embodiment.

In the cut part 50a moreover overflow orifices 26 as well as the seam line 44 which encloses the overflow orifices and at which the head gas cushion 18 is connected to the torso gas cushion 20 are shown.

Figure 13:
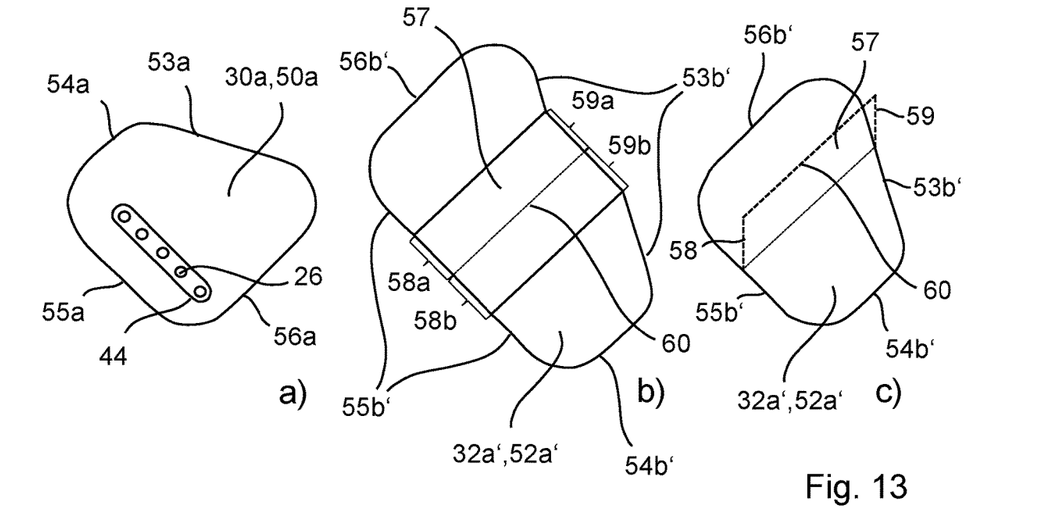

FIGS. 13a) to c) schematically show equally cut parts 50a and 52a' of a head gas cushion 18. The cut part 50a is identical to the cut part 50a shown in FIG. 5. The cut part 52a' differs from the cut part 52a in that the latter comprises a shaping portion 57. The shaping portion 57 may help adapt the volume and the shape of the head gas cushion 18 in the inflated condition.

For interconnecting the peripheral line portions 55a and 55b' as well as 53a and 53a' of the cut parts 50a and 52a', in the shown embodiment in a first step the shaping portion 57 is folded along the folding edge 60 so that the connecting portions 58a and 58b to the connecting line 58 and the connecting portions 59a and 59b to the connecting line 59 can be interconnected. In this way, the cut part 52a' shown in FIG. 13c) is formed, with the shaping portion 57 being shown in broken lines for better overview. In a second step, subsequently the peripheral line portion 53a is connected to the peripheral line portion 53b', the peripheral line portion 54a is connected to the peripheral line portion 54b', the peripheral line portion 55a is connected to the peripheral line portion 55b' and the peripheral line portion 56a is connected to the peripheral line portion 56b' of the cut parts 50a and 52a'.

Figure 14:
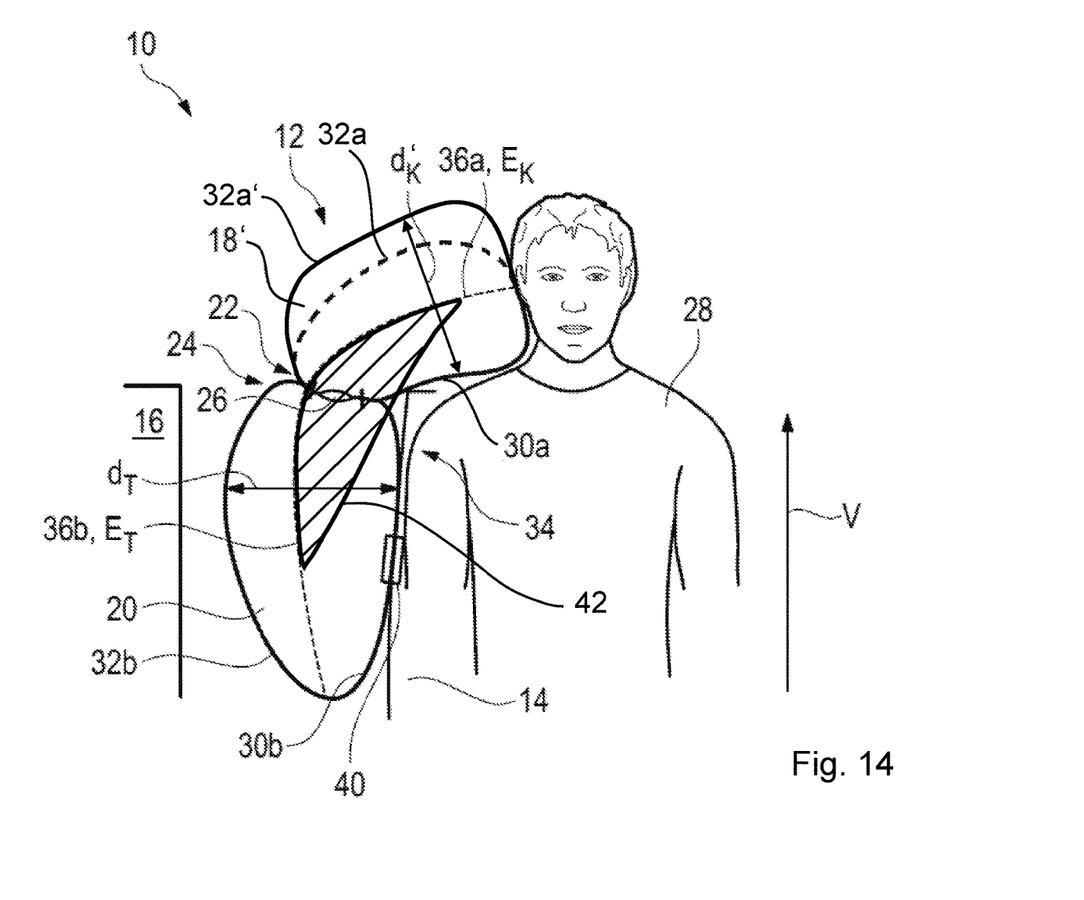
FIG. 14 is a schematic front view of another embodiment of a completely inflated side airbag according to the invention of a vehicle occupant restraint system according to the invention comprising a head gas cushion according to FIG. 13.

As is evident from FIG. 14, the head gas cushion 18' being formed has a larger thickness dk' between the outer wall portions 30a and 32a' as compared to the head gas cushion 18 shown in FIGS. 1 to 4. The shaping portion helps increase and adapt the volume and the thickness dk' of the head gas cushion and thus the lateral impact area for the head of the vehicle occupant 28. For better overview, the broken line shows the contour of the outer wall portion 32a of the head gas cushion 18 without any shaping portion 57. The side airbag 12 corresponds to the side airbag 12 of FIG. 4 except for the head gas cushion 18'.

Such shaping portion 57 may be arranged, depending on the embodiment and the requirements, in each of the outer wall portions of a side airbag 12 according to the invention. The shaping portion and the folding edge of the shaping portion may also be freely aligned, in response to the requirements, within a cut part and/or an outer wall portion.

Although the invention has been described for a side airbag in the form of a center airbag, the illustrated principle can also be conferred upon other airbags at the discretion of those skilled in the art, of course.

The invention claimed is:

1. A side airbag module comprising:
   a side airbag comprising an inflatable head gas cushion and an inflatable torso gas cushion, the torso gas cushion and head gas cushion being manufactured independently of each other as separate inflatable cushions interconnected with each other and forming separate inflatable compartments of the side airbag, wherein the side airbag further comprises at least one overflow orifice that fluidly connects the head gas cushion to the torso gas cushion, wherein the interconnection of the head gas cushion to the torso gas cushion is configured so that the head gas cushion bends toward the head of the occupant when the airbag is inflated;
   an inflator for providing inflation fluid for inflating both the torso gas cushion and the head gas cushion, the inflator being configured to direct inflation fluid into the torso gas cushion, the at least one overflow orifice being configured to direct inflation fluid from the torso gas cushion into the head gas cushion;
   wherein the side airbag and inflator are arranged on a backrest of a vehicle seat.

2. A side airbag of a vehicle occupant restraint system configured to be mounted on a vehicle seat, the side airbag comprising:
   an inflatable head gas cushion comprising overlying panels laid flat and interconnected along a peripheral line defining a head cushion parting plane when the head gas cushion is inflated, wherein the head gas cushion is configured so that one of the panels forms a first outer wall positioned on one side of the head cushion parting plane facing toward the occupant, and the other of the panels forms a second outer wall positioned on an opposite side of the head cushion parting plane facing away from the occupant;
   an inflatable torso gas cushion comprising overlying panels laid flat and interconnected along a peripheral line defining a torso cushion parting plane when the torso gas cushion is inflated, wherein the torso gas cushion is configured so that one of the panels forms a first outer wall positioned on one side of the torso cushion parting plane facing toward the occupant, and the other of the panels forms a second outer wall positioned on an opposite side of the torso cushion parting plane facing away from the occupant; and
   a connecting section in which the head gas cushion is connected to the torso gas cushion, the connecting section comprising at least one overflow orifice fluidly connecting the head gas cushion to the torso gas cushion to allow filling gas to overflow from the torso gas cushion to the head gas cushion, wherein the connecting section is configured to connect the head gas cushion obliquely to the torso gas cushion so that the head gas cushion bends toward the head of the occupant when the airbag is inflated, wherein the torso gas cushion and head gas cushion being manufactured independently of each other as separate inflatable cushions.

3. The side airbag according to claim 2, wherein the head gas cushion is fastened to an upper end of the torso gas cushion.

4. The side airbag according to claim 2, wherein the head gas cushion is connected to the torso gas cushion so that, in the inflated condition of the side airbag, the head gas cushion is bent in relation to the torso gas cushion.

5. The side airbag according to claim 4, wherein, in the mounted and inflated condition, an occupant side of the side airbag formed by outer wall portions of the head gas cushion and the torso gas cushion positioned close to the vehicle occupant extends in a concavely curved manner.

6. The side airbag according to claim 5, wherein:
   an outer wall of the head gas cushion includes two outer wall portions interconnected along a peripheral line, the peripheral line defining a head gas cushion parting plane; and
   an outer wall of the torso gas cushion including two outer wall portions which are interconnected along a peripheral line, the peripheral line defining a torso gas cushion parting plane,
   wherein the head gas cushion parting plane is inclined at an angle of about 20° to 90° in relation to the torso gas cushion parting plane.

7. The side airbag according to claim 6, wherein the connecting section between the head gas cushion and the torso gas cushion is located on a side of the parting planes close to the vehicle occupant.

8. The side airbag according to claim 6, wherein an extension of the head gas cushion and of the torso gas cushion along the respective parting planes is larger than a thickness of the inflated head and torso gas cushions, when viewed in a vehicle longitudinal direction.

9. The side airbag according to claim 5, wherein the connecting section between the head gas cushion and the torso gas cushion is disposed on the outer wall portion of the torso gas cushion close to the vehicle occupant.

10. The side airbag according to claim 9, wherein the connecting section between the head gas cushion and the torso gas cushion is disposed on the outer wall portion of the torso gas cushion close to the vehicle occupant and in a vehicle vertical direction in the upper 40% of the torso gas cushion.

11. The side airbag according to claim 9, wherein the connecting section between the head gas cushion and the torso gas cushion is located at the head gas cushion on a side of the parting plane far from the vehicle occupant at an outer wall portion far from the vehicle occupant.

12. The side airbag according to claim 5, wherein the connecting section between the head gas cushion and the torso gas cushion is disposed on the outer wall portion of the torso gas cushion close to the vehicle occupant in an upper end section of the outer wall portion of the torso gas cushion.

13. The side airbag according to claim 2, wherein the outer wall portions of the head gas cushion and the torso gas cushion are formed of cut fabric parts that are interconnected, wherein the cut parts can be separately flatly spread.

14. The side airbag according to claim 2, wherein an inflatable volume of the head gas cushion is smaller than an inflatable volume of the torso gas cushion.

15. The side airbag according to claim 2, wherein the connecting section includes at least one overflow orifice that fluidly connects the head gas cushion to the torso gas cushion.

16. The side airbag according to claim 15, wherein the head gas cushion and the torso gas cushion are configured to be inflated by a single inflator which directs inflation fluid into the torso gas cushion, wherein the at least one overflow orifice directs inflation fluid from the torso gas cushion into the head gas cushion to inflate the head gas cushion.

17. The side airbag according to claim 2, wherein the oblique connection of the connecting section is configured to form a pivot axis between the head gas cushion and the torso gas cushion.

18. The side airbag according to claim 2, further comprising a positioning element fastened to the torso gas cushion and the head gas cushion for stabilizing the position of the head gas cushion relative to the torso gas cushion in an inflated condition of the side airbag.

19. The side airbag according to claim 2, wherein at least one outer wall portion and/or cut part of the head gas cushion and/or of the torso gas cushion comprises a shaping portion.

20. The side airbag according to claim 2, further comprising a shaping tether arranged and/or integrated in the head gas cushion and/or in the torso gas cushion.

21. A vehicle occupant restraint system comprising a side airbag according to claim 2 configured to be mounted on a driver seat of a vehicle on a side facing a passenger seat of the vehicle.

22. The vehicle occupant restraint system according to claim 21, wherein the torso gas cushion includes an injecting portion configured to be fixed to a backrest of the driver seat.

23. The side airbag according to of claim 2, wherein the connecting section connects the first outer wall of the head gas cushion to the first outer wall of the torso gas cushion.

24. The side airbag according to of claim 23, wherein the at least one overflow orifice allows filing gas to overflow from the torso gas cushion to the head gas cushion through the first outer wall of the head gas cushion and the first outer wall of the torso gas cushion.

25. The side airbag according to of claim 2, wherein the connecting section connects the second outer wall of the head gas cushion to the first outer wall of the torso gas cushion.

26. The side airbag according to of claim 25, wherein the at least one overflow orifice allows filing gas to overflow from the torso gas cushion to the head gas cushion through the second outer wall of the head gas cushion and the first outer wall of the torso gas cushion.

27. The side airbag according to claim 17, wherein the pivot axis is arranged at an angle from 20° to 90° with a vehicle vertical axis.

* * * * *